(12) United States Patent
Ishimatsu et al.

(10) Patent No.: US 12,250,446 B2
(45) Date of Patent: Mar. 11, 2025

(54) IMAGE PROCESSING APPARATUS, IMAGE PICKUP APPARATUS, AND IMAGE PROCESSING METHOD FOR ACQUIRING POLARIZATION INFORMATION

(71) Applicant: CANON KABUSHIKI KAISHA, Tokyo (JP)

(72) Inventors: Rie Ishimatsu, Tochigi (JP); Tomohiko Ishibashi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 18/059,183

(22) Filed: Nov. 28, 2022

(65) Prior Publication Data

US 2023/0171480 A1 Jun. 1, 2023

(30) Foreign Application Priority Data

Dec. 1, 2021 (JP) .................. 2021-195669

(51) Int. Cl.
*H04N 23/60* (2023.01)
*G02B 5/30* (2006.01)
*H04N 23/12* (2023.01)
*H04N 23/55* (2023.01)

(52) U.S. Cl.
CPC .......... *H04N 23/60* (2023.01); *G02B 5/3083* (2013.01); *H04N 23/12* (2023.01); *H04N 23/55* (2023.01)

(58) Field of Classification Search
CPC ........ H04N 23/60; H04N 23/12; H04N 23/55; H04N 23/81; G02B 5/3083; G02B 27/0068; G02B 27/28
See application file for complete search history.

(56) References Cited

U.S. PATENT DOCUMENTS

| | | | |
|---|---|---|---|
| 2015/0301238 A1* | 10/2015 | Momoki | G02B 27/46 348/360 |
| 2016/0210754 A1* | 7/2016 | Ida | G06T 7/586 |
| 2016/0231582 A1* | 8/2016 | Yamaguchi | G02B 27/286 |
| 2018/0006066 A1* | 1/2018 | Okuno | H01L 27/14627 |

(Continued)

FOREIGN PATENT DOCUMENTS

| | | |
|---|---|---|
| JP | 2016-145924 A | 8/2016 |
| JP | 2018-010049 A | 1/2018 |

(Continued)

*Primary Examiner* — Padma Haliyur
(74) *Attorney, Agent, or Firm* — Canon U.S.A., Inc. IP Division

(57) ABSTRACT

An image processing apparatus includes at least one processor, and a memory coupled to the at least one processor, the memory storing instructions that, when executed by the processor, perform operations as a first acquiring unit, a second acquiring unit, a setting unit, and a third acquiring unit. The first acquiring unit is configured to acquire a first image generated by imaging an object via a polarizing element configured to transmit lights having a plurality of polarization azimuths different from each other. The second acquiring unit is configured to acquire information on an imaging condition in the imaging. The setting unit is configured to set information on a polarization azimuth in the first image according to the information on the imaging condition. The third acquiring unit is configured to acquire polarization information from the first image using the information on the polarization azimuth.

18 Claims, 11 Drawing Sheets

(56) References Cited

U.S. PATENT DOCUMENTS

| | | | |
|---|---|---|---|
| 2020/0217951 A1* | 7/2020 | Park | G01S 13/343 |
| 2020/0228732 A1* | 7/2020 | Yamaguchi | H01L 27/14625 |
| 2021/0201450 A1* | 7/2021 | Kurita | G06T 7/40 |
| 2023/0367053 A1* | 11/2023 | Reshetouski | H04N 25/443 |

FOREIGN PATENT DOCUMENTS

| | | | | |
|---|---|---|---|---|
| JP | 2020-199697 | * | 2/2020 | |
| WO | WO-2022080121 A1 | * | 4/2022 | G02B 5/201 |

* cited by examiner

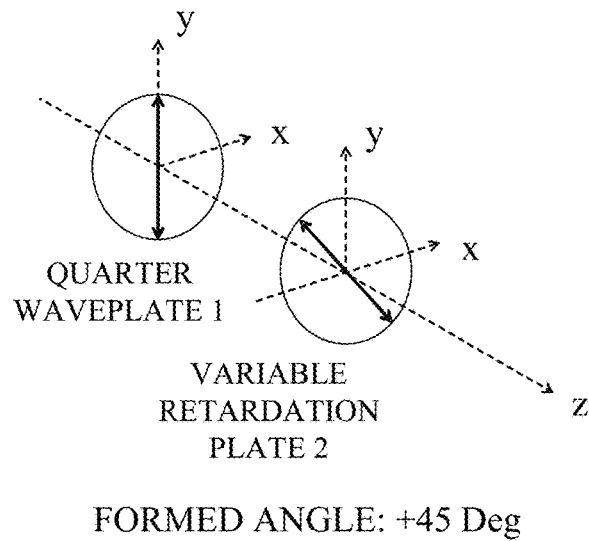 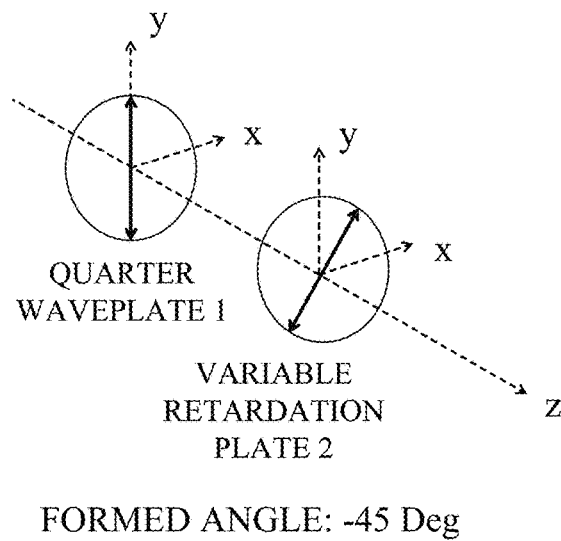
FIG. 4A     FIG. 4B
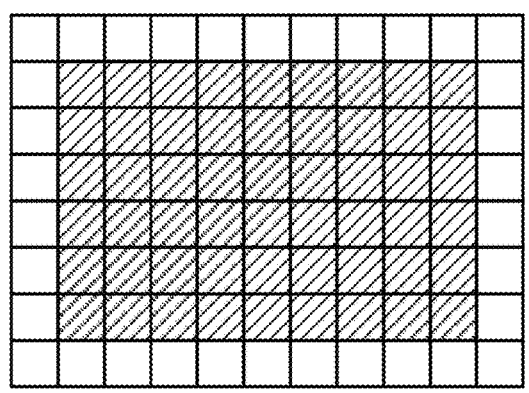 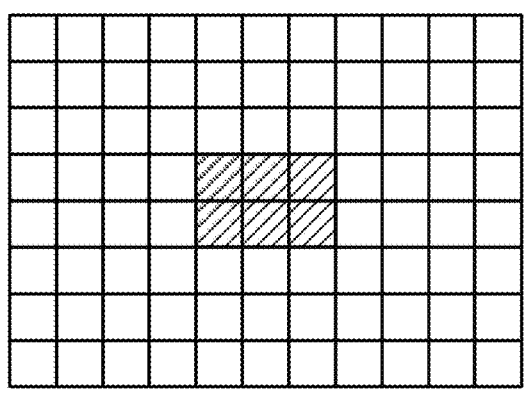
FIG. 5A     FIG. 5B

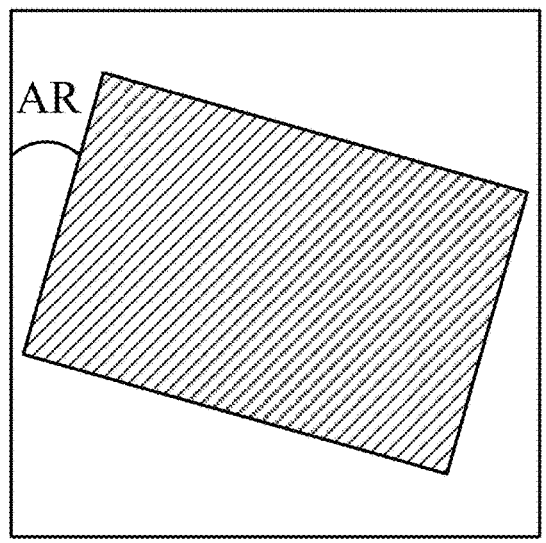
FIG. 6
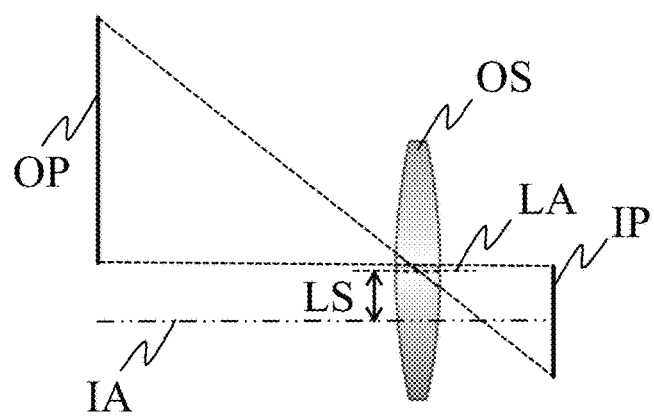 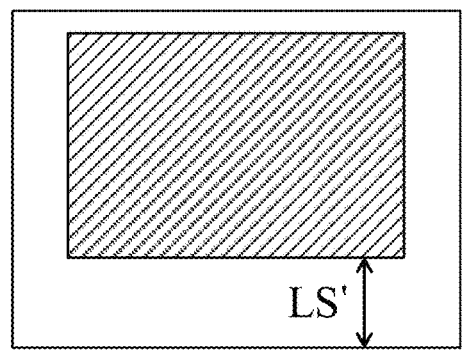
FIG. 7A                    FIG. 7B

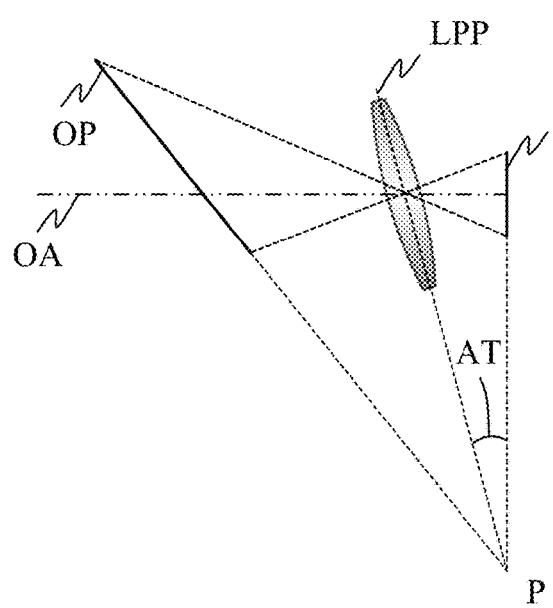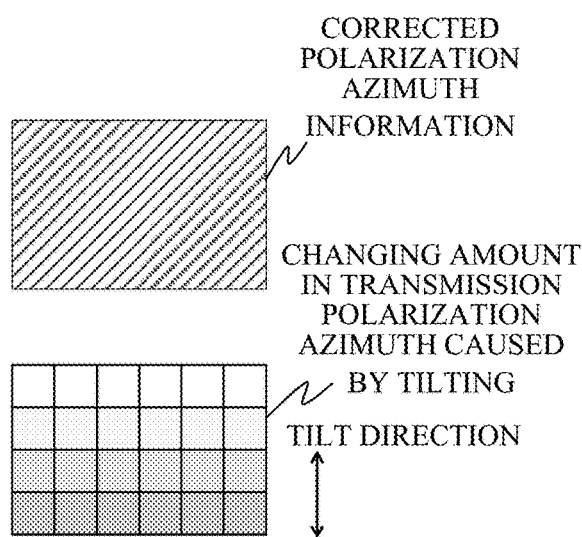
FIG. 8A  FIG. 8B
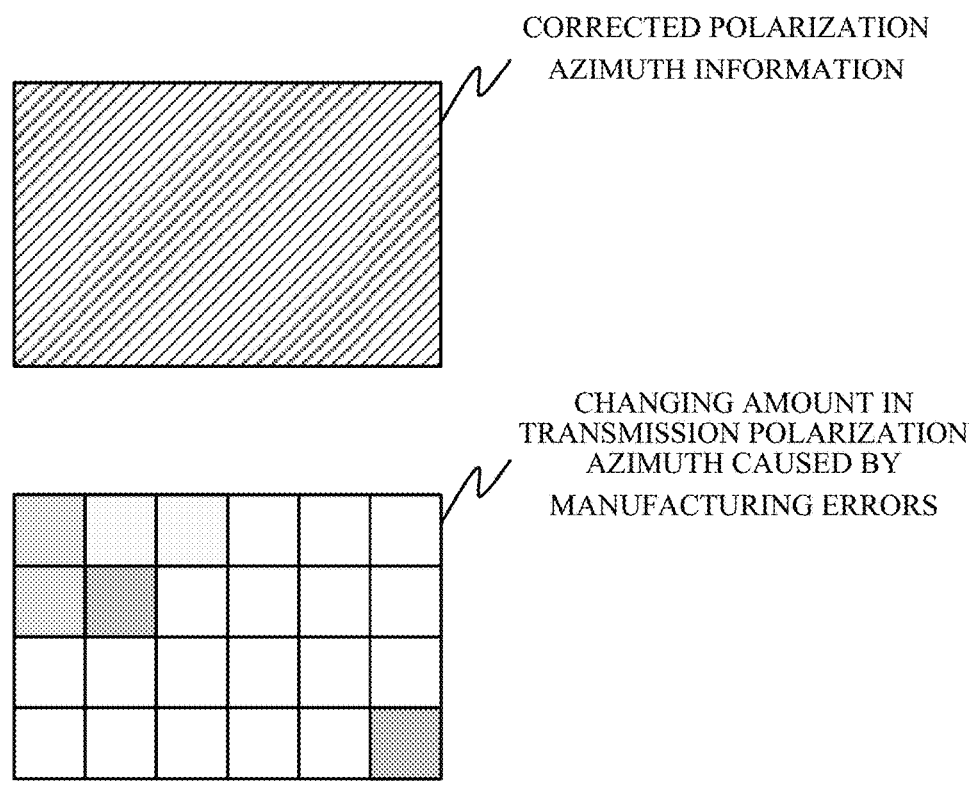
FIG. 9

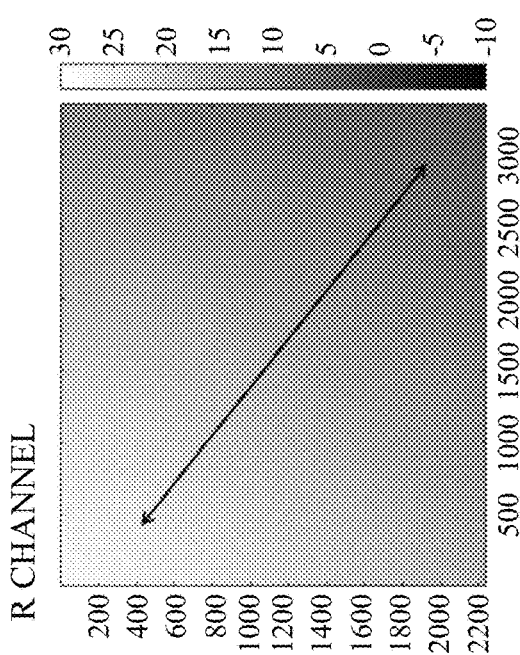
FIG. 10A
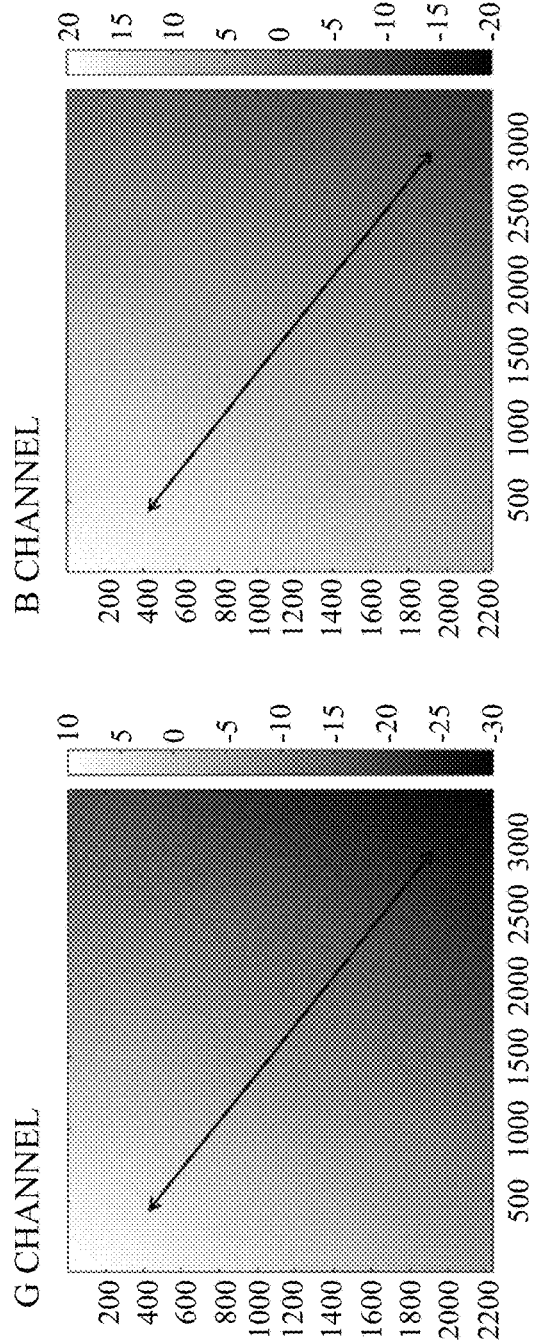
FIG. 10B
FIG. 10C

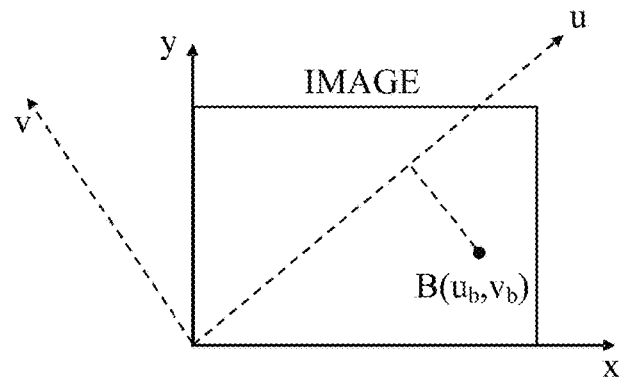
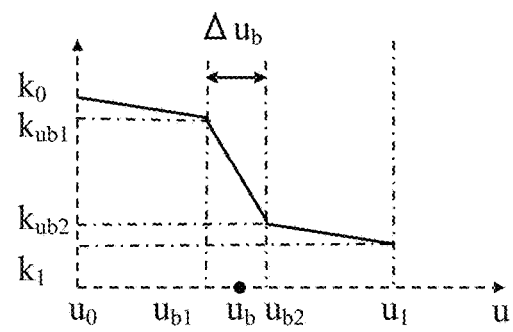
FIG. 15A  FIG. 15B
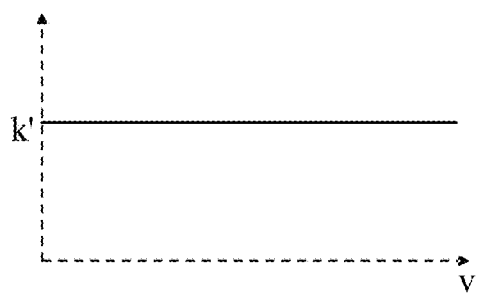
FIG. 15C
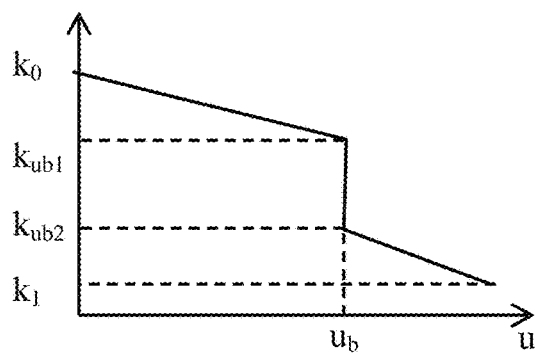
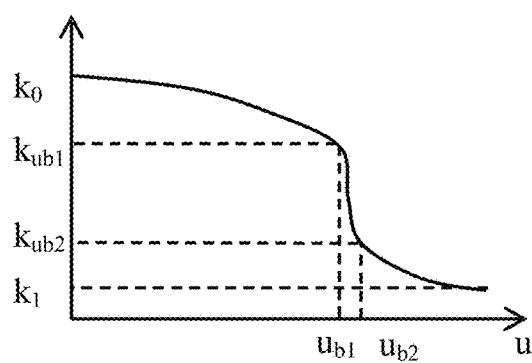
FIG. 16A  FIG. 16B

IMAGE PROCESSING APPARATUS, IMAGE PICKUP APPARATUS, AND IMAGE PROCESSING METHOD FOR ACQUIRING POLARIZATION INFORMATION

BACKGROUND

Technical Field

The aspect of the embodiments relates to an image processing technology using polarization information acquired from a captured image.

Description of the Related Art

A method of acquiring a plurality of captured images by rotating a polarizing plate during imaging using the polarizing plate is known as an imaging method for acquiring polarization information indicating a polarization azimuth and intensity and intensity of a non-polarized light component from an object. As disclosed in Japanese Patent Laid-Open No. JP 2016-145924, there is a method of acquiring a plurality of captured images having different polarization states without rotating a polarizing plate that includes a retardation plate (quarter waveplate), a variable retardation plate (liquid crystal), and a polarizing plate during imaging via the polarizing element, by changing a phase difference given to a ray by the variable retardation plate.

JP 2018-010049 discloses a method of reducing the influence of an incident angle characteristic of the variable retardation plate on the polarization information in the imaging using the polarizing element, by setting an optic axis of the variable retardation plate to be parallel to a short side of an image sensor.

However, in the methods disclosed in JPs 2016-145924 and 2018-010049, the influence of the incident angle characteristic on the acquired polarization information becomes nonnegligible in an area in a captured image in which an incident angle of a ray on the variable retardation plate is relatively large, and in an area in which a phase difference given to a ray by the variable retardation plate is so large that the incident angle characteristic is relatively lowered.

SUMMARY

The disclosure provides an image processing apparatus, an imaging apparatus using the same, and the like, each of which can provide polarization information while reducing the influence of an incident angle characteristic of a polarizing element.

An image processing apparatus according to one aspect of the disclosure includes at least one processor, and a memory coupled to the at least one processor, the memory storing instructions that, when executed by the processor, perform operations as a first acquiring unit, a second acquiring unit, a setting unit, and a third acquiring unit. The first acquiring unit is configured to acquire a first image generated by imaging an object via a polarizing element configured to transmit lights having a plurality of polarization azimuths different from each other. The second acquiring unit is configured to acquire information on an imaging condition in the imaging. The setting unit is configured to set information on a polarization azimuth in the first image according to the information on the imaging condition. The third acquiring unit is configured to acquire polarization information from the first image using the information on the polarization azimuth.

An image pickup apparatus including the above image processing apparatus also constitutes another aspect of the disclosure. An image processing method corresponding to the above image processing apparatus and a computer-readable non-transitory storage medium storing a program that causes a computer to execute this image processing method also constitute another aspect of the disclosure.

Further features of the disclosure will become apparent from the following description of exemplary embodiments with reference to the attached drawings.

BRIEF DESCRIPTION OF THE DRAWINGS

FIGS. 4A and 4B illustrate a relationship between axial azimuths of a quarter waveplate and a variable retardation plate according to the first embodiment.

FIGS. 5A and 5B illustrate a use area of corrected polarization azimuth information according to the first embodiment.

FIG. 6 illustrates a rotation of the use area according to the first embodiment;

FIGS. 7A and 7B illustrate a parallel movement of the use area according to the first embodiment.

FIGS. 8A and 8B illustrate a tilt of an optical system to an image sensor and a setting of corrected polarization azimuth information at that time according to the first embodiment.

FIG. 9 illustrates a setting of corrected polarization azimuth information for compensating manufacturing errors according to the first embodiment.

FIGS. 10A to 10C illustrate an example of corrected polarization azimuth information converted into data according to the first embodiment.

FIGS. 15A to 15C illustrate changes in an axial azimuth and correction coefficient according to reference example 1.

FIGS. 16A and 16B illustrate other correction coefficient changes according to reference example 1.

DESCRIPTION OF THE EMBODIMENTS

Referring now to the accompanying drawings, a description will be given of embodiments according to the disclosure. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

First Embodiment

An image processing apparatus according to a first embodiment has a function of acquiring polarization information from one or more of captured images (first image or images) obtained by imaging an object using a polarizing element that transmits lights having a plurality of polarization azimuths different from each other. The image processing apparatus has another function of correcting an incident angle characteristic of the polarizing element (that is, uneven in-plane distribution of a transmission polarization azimuth). The image processing apparatus has another function of generating a combined image (second image) using the acquired polarization information.

Figure 1:
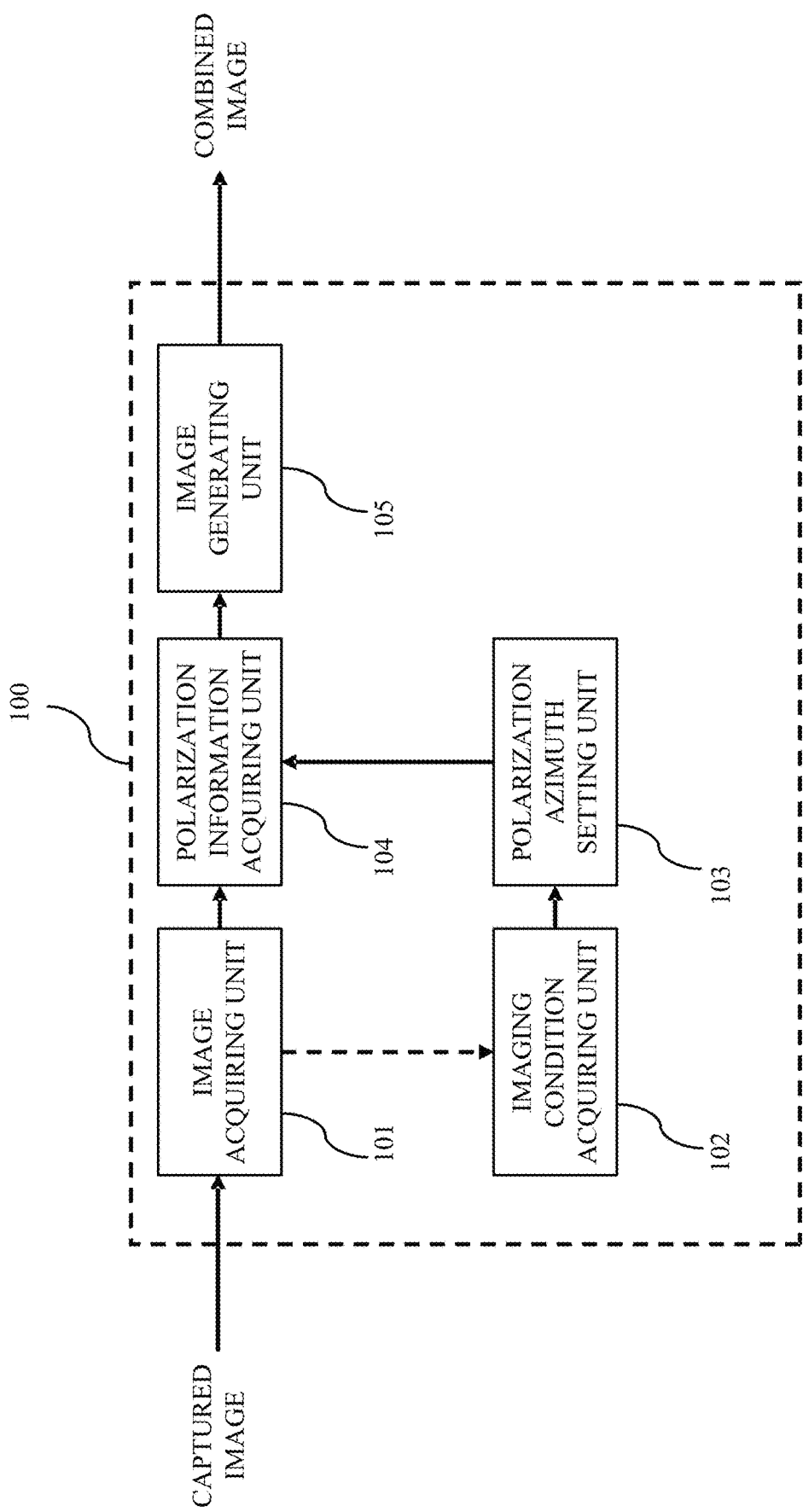
FIG. 1 illustrates a configuration of an image processing apparatus according to a first embodiment.

FIG. 1 illustrates a configuration of an image processing apparatus 100 according to the first embodiment. The image processing apparatus 100 includes at least one processor, and a memory coupled to the at least one processor. The memory has instructions that, when executed by the processor, perform operations as an image acquiring unit (first acquiring unit) 101, an imaging condition acquiring unit (second acquiring unit) 102, a polarization azimuth setting unit (setting unit) 103, a polarization information acquiring unit (third acquiring unit) 104, and an image generating unit 105.

The image acquiring unit 101 is configured to acquire a captured image generated by imaging the object using an image pickup apparatus that includes an optical system, a polarizing element, and an image sensor. The image processing apparatus 100 may be an apparatus, such as a personal computer (PC), separate from the image pickup apparatus or may be mounted in the image pickup apparatus as described below.

The polarization information acquiring unit 104 is configured to acquire polarization information using the corrected polarization azimuth information set by the polarization azimuth setting unit 103. The polarization information and the corrected polarization azimuth information will be described below.

The image generating unit 105 is configured to generate a combined image using the acquired polarization information. A specific example of the combined image will be described below.

The imaging condition acquiring unit 102 is configured to acquire information on an imaging condition during imaging (information indicating the imaging condition or information that can be converted into the imaging condition: referred to as imaging condition information hereinafter) in calculating the polarization information. The imaging condition will be described below.

The polarization azimuth setting unit 103 is configured to set information on the polarization azimuth in the captured image, that is, the corrected polarization azimuth information, by correcting the transmission polarization azimuth based on the incident angle characteristic of the polarizing element according to the acquired imaging condition information. The corrected polarization azimuth information indicates information that indicates the polarization azimuth for acquiring the polarization information, which is set for each pixel or area in a captured image (for example, for each pixel or area corresponding to a position or area having a different ray incident angle in the polarizing element), or information that can be converted into the polarization information.

Figure 11:
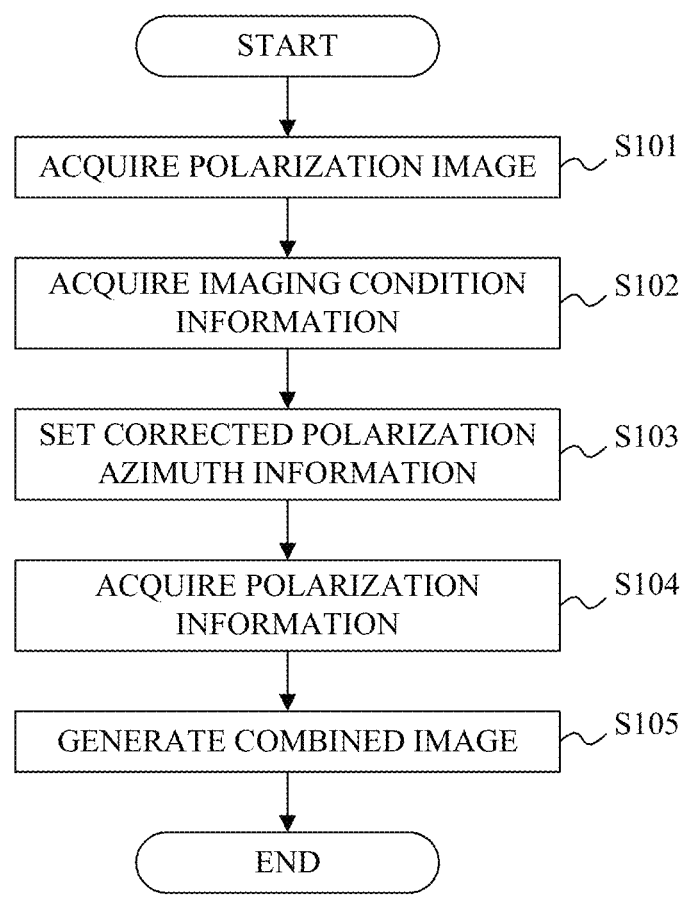
FIG. 11 is a flowchart illustrating processing according to the first embodiment.

A detailed description will now be given of processing to be executed by each component in the image processing apparatus 100 described above. A flowchart illustrated in FIG. 11 illustrates a flow of the above processing (image processing method), and the corresponding step numbers (S101 to S105) are given in parentheses in the following description. The image processing apparatus 100 as a computer executes this processing according to a (computer) program.

The image acquiring unit 101 acquires a plurality of captured images having different transmission polarization azimuths, which have been generated by imaging the object using the image pickup apparatus that includes the polarizing element as described above (S101).

The polarizing element in the image pickup apparatus is an element having a variable transmission polarization azimuth as a polarization azimuth of light that passes through it. Such a polarizing element can include, for example, a polarizing plate that is rotatable around the optical axis of the optical system, and a variable retardation plate configured to change a phase difference to be applied to transmitting light as disclosed in JPs 2016-145924 and 2018-010049. The variable retardation plate can include VA liquid crystal, OCB liquid crystal, or the like. An image pickup apparatus having a polarizing element with a variable transmission polarization azimuth generates a plurality of captured images each including polarization information in a different transmission polarization azimuth by multiple imaging with different transmission polarization azimuths of the polarizing element.

The polarizing element may be disposed between the object and the image sensor. More specifically, the polarizing element may be disposed on the object side of the optical system, or inside the optical system, or between the optical system and the image sensor. However, in a case where a material having birefringence or another polarizing element is disposed between the object and the polarizing element, a polarization state of light from the object will be disturbed. Therefore, in a case where the image pickup apparatus includes a plastic lens, a variable neural density (ND) using a polarizing plate, an optical low-pass filter made of a birefringent material, etc., the polarizing element may be disposed on the object side of that optical element.

The polarizing element may have a plurality of transmission polarization azimuths. For example, the polarizing element may include a plurality of polarizing plates having different transmission polarization azimuths and each disposed for each pixel in the image sensor. That is, the image sensor may use a polarization image sensor having a polarizing plate for each pixel. In this case, the image pickup apparatus generates one captured image including polarization information in a plurality of transmission polarization azimuths by single imaging with the polarization image sensor.

The captured image may be of any format as long as it is image data, but may be a so-called RAW image that has not undergone any processing such as compression or correction.

The imaging condition acquiring unit 102 acquires the imaging condition information during imaging each captured image acquired by the image acquiring unit 101 (S102). The imaging condition includes various conditions relating to imaging, except for a condition relating to the polarizing element, and can include a focal length of the optical system, an F-number, a spectral transmittance, an exit pupil position, a focus state, an object distance, an imaging magnification, and a type and specification of the optical system. In a case where the optical system is displaceable in a shift or tilt direction relative to the image sensor, the imaging condition further includes a displacement amount (shift or tilt amount). The imaging condition can include a size of the image sensor, a maximum image height, a pixel pitch, a total pixel number, and a crop pixel number. The imaging condition may include temperature, humidity, atmospheric pressure, and identification (ID) information about the image pickup apparatus.

The imaging condition acquiring unit 102 acquires the imaging condition information (S1) by reading information indicating the imaging condition manually set for the imaging apparatus by the user, and by reading imaging condition information added as meta information to a header area of the captured image or the designated area in the Exif format. The imaging condition acquiring unit 102 may acquire the imaging condition information by analyzing the captured image using a method such as deep learning, or may acquire the imaging condition information from another device such as a distance measuring apparatus that is used during imaging and a control apparatus that controls the image pickup apparatus.

The polarization azimuth setting unit 103 acquires information on the transmission polarization azimuth of the polarizing element during imaging (for example, information on the voltage applied to the variable retardation plate, which will be described below). The polarization azimuth setting unit 103 sets corrected polarization azimuth information according to the imaging condition information acquired by the imaging condition acquiring unit 102 and the information on the transmission polarization azimuth of the polarizing element during imaging (S103).

Ideally, the polarizing element may have a constant transmission polarization azimuth and a constant transmittance regardless of an incident angle of incident light. However, in reality, the optical path length and the apparent angle of the slow axis of the polarizing element change depending on the incident angle of the ray on the polarizing element, so that the transmission polarization azimuth and transmittance of the polarizing element have distributions. In particular, in a case where an incident angle range is wide or the polarizing element including the variable retardation plate described above is used, changes in the transmission polarization azimuth and the transmittance in the plane of the polarizing element becomes significant. Among them, the in-plane distribution of the transmission polarization azimuth has a significant influence on the polarization information acquired from the captured image. Accordingly, this embodiment sets the corrected polarization azimuth information according to the imaging condition (information), and thereby reduces the influence of the incident angle characteristic of the polarizing element on the polarization information acquired from the captured image.

The corrected polarization azimuth information is set by storing as data the corrected polarization azimuth information previously calculated with a plurality of imaging conditions and a plurality of transmission polarization azimuths of the polarizing element and by acquiring, from the data, proper corrected polarization azimuth information according to the imaging condition information acquired by the imaging condition acquiring unit 102. A method for calculating the corrected polarization azimuth information will be described below. Assume that the polarizing element is a polarizing plate having a transmission polarization azimuth θ. Then, the Muller matrix can be defined by the following equation (1).

$$\begin{pmatrix} 1 & 0 & 0 & 0 \\ 0 & \cos2\theta & -\sin2\theta & 0 \\ 0 & \sin2\theta & \cos2\theta & 0 \\ 0 & 0 & 0 & 1 \end{pmatrix} \begin{pmatrix} m_{11} & m_{12} & 0 & 0 \\ m_{21} & m_{22} & 0 & 0 \\ 0 & 0 & 0 & 0 \\ 0 & 0 & 0 & 0 \end{pmatrix} \begin{pmatrix} 1 & 0 & 0 & 0 \\ 0 & \cos2\theta & \sin2\theta & 0 \\ 0 & -\sin2\theta & \cos2\theta & 0 \\ 0 & 0 & 0 & 1 \end{pmatrix} = \quad (1)$$

$$\begin{pmatrix} m_{11} & m_{12}\cos2\theta & m_{12}\sin2\theta & 0 \\ m_{21}\cos2\theta & m_{22}\cos^22\theta & m_{22}\sin2\theta\cos2\theta & 0 \\ m_{11}\sin2\theta & m_{22}\sin2\theta\cos2\theta & m_{22}\sin^22\theta & 0 \\ 0 & 0 & 0 & 0 \end{pmatrix}$$

Where S0 to S3 are Stokes parameters of light incident on the polarizing element, and S0' to S3' are Stokes parameters of light emitted from the polarizing element, S0' to S3' are expressed by the following equation (2).

$$\begin{pmatrix} S'_0 \\ S'_1 \\ S'_2 \\ S'_3 \end{pmatrix} = \begin{pmatrix} m_{11} & m_{12}\cos2\theta & m_{12}\sin2\theta & 0 \\ m_{21}\cos2\theta & m_{22}\cos^22\theta & m_{22}\sin2\theta\cos2\theta & 0 \\ m_{11}\sin2\theta & m_{22}\sin2\theta\cos2\theta & m_{22}\sin^22\theta & 0 \\ 0 & 0 & 0 & 0 \end{pmatrix} \begin{pmatrix} S_0 \\ S_1 \\ S_2 \\ S_3 \end{pmatrix} \quad (2)$$

The light intensity (luminance) I to be measured is thus expressed by the following equation (3).

$$I = S_0' = (m_{11}S_0 + m_{12}\cos2\theta S_1 + m_{12}\sin2\theta S_2) \quad (3)$$

The Stokes parameters of linearly polarized lights with polarization azimuths of 0°, 45°, 90° and 135° are respectively represented by the following equation (4).

$$\begin{pmatrix} S_0 \\ S_1 \\ S_2 \end{pmatrix} = \begin{pmatrix} 1 \\ 1 \\ 0 \end{pmatrix}, \begin{pmatrix} 1 \\ 0 \\ 1 \end{pmatrix}, \begin{pmatrix} 1 \\ -1 \\ 0 \end{pmatrix}, \begin{pmatrix} 1 \\ 0 \\ -1 \end{pmatrix} \quad (4)$$

Therefore, the light intensities I0°, I45°, I90° and I135° to be measured in a case where linearly polarized lights of 0°, 45°, 90° and 135° are incident are given by the following equations (5) to (8).

$$I0° = \frac{1}{2}(m_{11} + m_{12}\cos2\theta) \quad (5)$$

$$I45° = \frac{1}{2}(m_{11} + m_{12}\sin2\theta) \quad (6)$$

$$I90° = \frac{1}{2}(m_{11} - m_{12}\cos2\theta) \qquad (7)$$

$$I135° = \frac{1}{2}(m_{11} - m_{12}\sin2\theta) \qquad (8)$$

From the equations (5) to (8), the polarization azimuth θ is expressed by the following equation (9).

$$\theta = \frac{1}{2}\tan^{-1}\left(\frac{I45° - I135°}{I0° - I90°}\right) \qquad (9)$$

The corrected polarization azimuth information can be calculated from the equation (9) with the imaging conditions and the transmission polarization azimuths of the polarizing element in a case where four linearly polarized lights (0°, 45°, 90°, 135°) from the object are imaged by the image pickup apparatus.

The method for calculating the corrected polarization azimuth information is not limited to the above method, and the corrected polarization azimuth information may be acquired by performing imaging while changing the polarization azimuth of the linearly polarized light, and by setting the polarization azimuth that maximizes the measured light intensity to the corrected polarization azimuth information. The corrected polarization azimuth information may be calculated from the theoretical incident angle characteristic of the polarizing element without actually imaging.

Thus, this embodiment acquires and creates data of the corrected polarization azimuth information associated with the imaging condition information, the imaging condition information, the transmission polarization azimuth of the polarizing element, and the light incident angle of the polarizing element through prior measurement (imaging) or calculation, and sets the corrected polarization azimuth information during imaging using the data. This method saves arduous calculation of the corrected polarization azimuth information for each imaging. In addition, by creating data of the corrected polarization azimuth information associated with the imaging condition information, the corrected polarization azimuth information during imaging can be set with a smaller amount of data than a case where data is stored for all combinations of optical systems and image sensors.

For example, in a case where the polarizing element is disposed between the object and the optical system, an angle of view of a ray incident on the polarizing element can be roughly determined by an angle of view calculated from the focal length of the optical system and the size of the image sensor. In a case where the polarizing element is disposed between the optical system and the image sensor, the incident angle of the ray on the polarizing element can be roughly determined based on the exit pupil position of the optical system and the image sensor size. Hence, properly corrected polarization azimuth information can be set without calculating the corrected polarization azimuth information during imaging, by previous imaging or calculation under a plurality of imaging conditions with different angles of view, exit pupil positions, and image sensor sizes, and by converting the resulting corrected polarization azimuth information into data.

In order to improve the accuracy of the corrected polarization azimuth information, the imaging condition may include the focus state of the optical system, the F-number, the imaging magnification, the object distance (position of the object), and the shift or tilt amount of the optical system relative to the image sensor. The focus state of the optical system is the position and control amount of the lens unit that is movable during focusing. Since the incident angle of a ray on the polarizing element changes significantly depending on the F-number and focus state in an optical system having a large imaging magnification, the imaging condition may include the F-number and focus state. In a case where an optical system having a shift and/or tilt functions relative to the image sensor, the shift and/or tilt amounts may be considered.

The corrected polarization azimuth information data acquired by prior measurement or calculation may be stored in a storage unit (memory) provided in or separate from the polarization azimuth setting unit 103. General data storage media such as a hard disk drive, flash memory, optical disc, cloud computing, etc. can be used for the storage unit.

The polarization information acquiring unit 104 calculates (acquires) polarization information from the captured image (S104) using the captured image acquired by the image acquiring unit 101 and the corrected polarization azimuth information set by the polarization azimuth setting unit 103. More specifically, for example, the polarization information acquiring unit 104 extracts a luminance value (signal value) of a specific pixel from each of a plurality of captured images with different transmission polarization azimuths, plots a luminance value for each polarization azimuth, and thereby acquires a luminance change against a change in polarization azimuth.

Figure 2A:
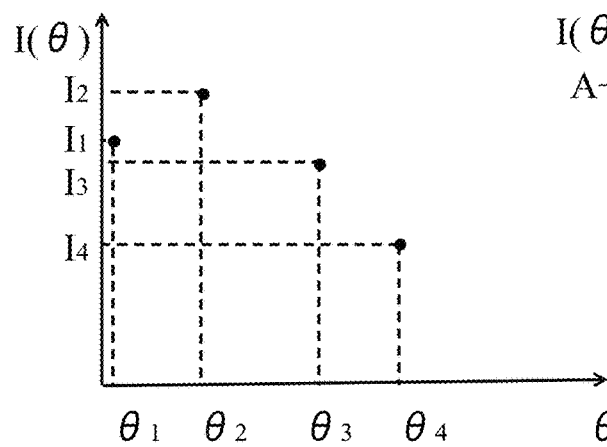
FIGS. 2A and 2B illustrate a relationship between luminance and a transmission polarization azimuth according to the first embodiment.
Figure 2B:
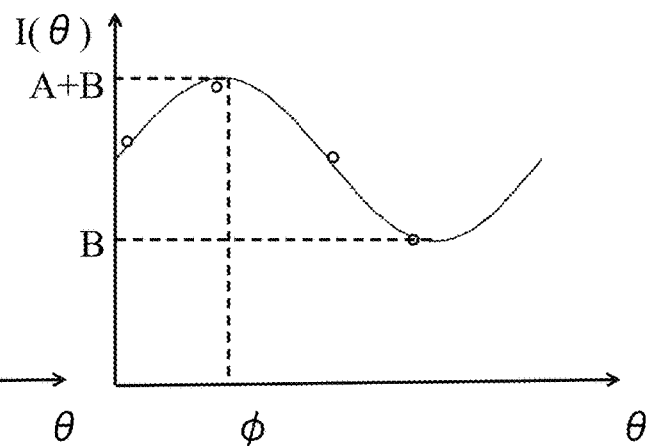

FIG. 2A illustrates an example in which luminances I1 to I4 of specific pixels obtained from captured images with four different transmission polarization azimuths θ1 to θ4 are plotted for each polarization azimuth. FIG. 2B illustrates the result of fitting a change in luminance I against the polarization azimuth θ from the plotted results of FIG. 2A using the following equation (10).

$$I(\theta) = A\cos^2(\theta - \varphi) + B \qquad (10)$$

In the equation (10), "A" denotes a polarized light component (luminance component that varies depending on the polarization azimuth) in a specific image, and "B" denotes a non-polarized light component (a constant luminance component regardless of the polarization azimuth). "φ" denotes a polarization azimuth in which the polarized light component A has a maximum value.

As illustrated in FIG. 2A, the luminance changes like a cosine function relative to the change in polarization azimuth. Therefore, the luminance change relative to the change in the polarization azimuth can be acquired by imaging with three or more different transmission polarization azimuths of the polarizing element and plotting the luminances. This embodiment calculates (acquires) as polarization information "A," "B," and "φ" in the equation (10) indicating the luminance change against the polarization azimuth (corrected polarization azimuth information).

Before the polarization information is calculated, preprocessing may be performed for a captured image if necessary. For example, in a case where there are a plurality of captured images, an alignment may be made so that the same object is located at the same position among these captured images. In a case where the captured image is an image that has undergone gamma processing, inverse gamma processing may be performed as preprocessing. In a case where the captured image is an image for which image processing is performed such as distortion correction, projection method conversion, and luminance correction, the influence of the image processing may be eliminated by performing inverse processing as preprocessing.

The image generating unit 105 creates an arbitrarily combined image (second image) using the polarization information A, B, and φ calculated by the polarization information acquiring unit 104 (S105). More specifically, for example, the combined image is generated by linearly summing the polarized light component $A \cos^2(\theta_c-\varphi)$ with the polarized light component A at a specific polarization azimuth $\theta_c$ and the non-polarized light component B. The polarized light component contains more specular reflection components, and the non-polarized light component contains more diffuse reflection components. Thus, a ratio of the specular reflection component and the diffuse reflection component in the combined image can be arbitrarily adjusted by generating the combined image using the linear sum.

Luminance Im of each pixel in the combined image is calculated by the addition equation illustrated in the following equation (11):

$$I_m = k_1 A \cos^2\{k_2(\theta_c-\theta_p)\} + k_3 A + k_4 B \quad (11)$$

where k1 to k4 in the equation (11) are arbitrary constants (referred to as parameters hereinafter).

Figure 3A:
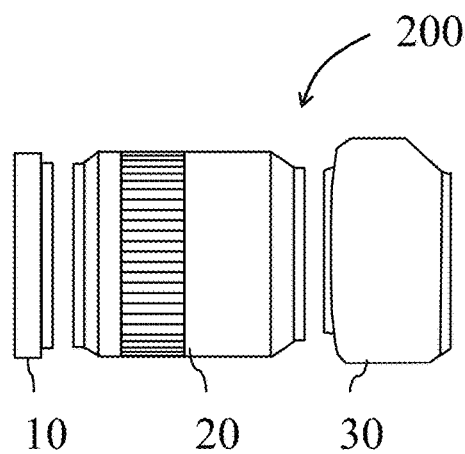
FIGS. 3A and 3B illustrate an image pickup apparatus that includes an image processing apparatus according to the first embodiment.

FIG. 3A illustrates an image pickup apparatus 200 mounted with the image processing apparatus 100 illustrated in FIG. 1. The image pickup apparatus 200 includes a polarizing element filter 10, a lens 20, and a camera body 30. The polarizing element filter 10 includes a polarizing element, and the lens 20 includes an optical system. The camera body 30 includes an image sensor and the image processing apparatus 100. The polarizing element filter 10 is attachable to and detachable from the lens 20, and the lens 20 is attachable to and detachable from the camera body 30.

Figure 3B:
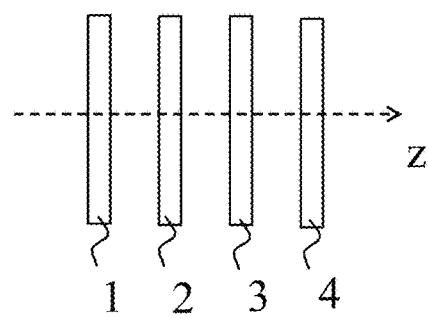

As illustrated in FIG. 3B, the polarizing element in the polarizing element filter 10 includes, in order from the object side to the lens side, a quarter waveplate 1, a variable retardation plate 2, a polarizing plate 3, and a quarter waveplate 4. Slow or transmission axes of these elements (1 to 4) are tilted to each other such that they form an angle of 45 degrees between the adjacent elements.

The variable retardation plate 2 includes VA liquid crystal. Changing the voltage applied to the variable retardation plate 2 can control a phase difference given to a ray passing through it between 0 and a predetermined maximum value. A maximum value Δmax of the phase difference is defined by the following equation (12).

$$\Delta max = |no-ne|d \quad (12)$$

In the equation (12), "no" is a refractive index of the variable retardation plate (liquid crystal layer) 2 to an ordinary ray, and "ne" is a refractive index to an extraordinary ray. "d" is a thickness of the liquid crystal layer. Since both the refractive index and thickness of the liquid crystal layer change according to the incident angle of the ray, the phase difference given to the ray by the liquid crystal layer has an incident angle characteristic, and the larger Δmax is, the more significantly the phase difference changes.

The polarizing element filter 10 can variably set the transmission polarization azimuth by changing the phase difference given to the ray by the variable retardation plate 2. A transmission polarization azimuth T (deg) is variable according to the following equation (13) and a phase difference Δ(nm) given by the variable retardation plate 2.

$$T = T_0 \pm 180 \cdot \Delta/\lambda_0 \quad (13)$$

In the equation (12), $T_0$ is an azimuth (deg) of the transmission axis of the polarizing plate 3, and $\lambda_0$ is a wavelength (nm) of an incident ray. In addition, for ± in the equation, + is set in a case where an angle formed between the slow axes of the quarter waveplate 1 and the variable retardation plate 2 is +45 degrees, and − is set in a case where the angle is −45 degrees. The angle formed between the slow axes is +45 degrees in a case where the slow axis of the variable retardation plate 2 is located at 45 degrees in the counterclockwise direction from the slow axis of the quarter waveplate 1, and the angle is −45 degrees in a case where the slow axis of the variable retardation plate 2 is located at 45 degrees in the clockwise direction from the slow axis of the quarter waveplate 1.

FIGS. 4A and 4B illustrate a case where the slow axis of the quarter waveplate 1 is disposed at 90 degrees from the x-axis. The z-axis is the optical axis of the optical system, and a direction from the object side to the image sensor side is set positive. The angle of the x-axis is set to 0 degrees, and the counterclockwise direction is set positive in a case where the object is viewed from the image sensor side. As illustrated in FIG. 4A, in a case where the slow axis of the variable retardation plate 2 is located at 135 degrees from the x-axis, the angle formed by the slow axes of the quarter waveplate 1 and the variable retardation plate 2 is +45 degrees. As illustrated in FIG. 4B, in a case where the slow axis of the variable retardation plate 2 is located at 45 degrees from the x-axis, the angle formed by the slow axes of the quarter waveplate 1 and the variable retardation plate 2 is −45 degrees.

In this embodiment, the image acquiring unit 101 acquires three or more captured images generated by imaging while the transmission polarization azimuths of the polarizing elements in the polarizing element filter 10 are different from each other.

Here, the larger the Δmax is, the wider a range of the transmission polarization azimuth T that can be set by the equation (12) becomes. In order to improve the acquisition accuracy of the difference ΔT between the maximum value and the minimum value of T, considering the period of the equation (10), it may be 90° or more, or 120° or more, relative to the reference wavelength $\lambda_0$. In a case where the incident angle characteristic and period of the variable retardation plate 2 are considered, ΔT may be less than 180° or less than 150° relative to the reference wavelength $\lambda_0$. The reference wavelength $\lambda_0$ can be arbitrarily set within the imaging wavelength range, and may be set according to the purpose, such as a middle wavelength, the minimum wavelength, or the maximum wavelength within the imaging wavelength range.

Since the polarizing element filter 10 is positioned between the object and the optical system, as described above, the incident angle of a ray on the polarizing element filter 10 can be roughly determined by the angle of view. The imaging condition acquiring unit 102 according to this embodiment acquires the focal length of the lens (optical system) 20 and the image sensor size in the camera body 30 (referred to as sensor size hereinafter) from the header information in the captured image.

The polarization azimuth setting unit 103 calculates the angle of view during imaging from the focal length and sensor size acquired by the imaging condition acquiring unit 102. The polarization azimuth setting unit 103 selects the corrected polarization azimuth information corresponding to the angle of view during imaging and the voltage applied to the variable retardation plate 2 from the data of the corrected polarization azimuth information that has been previously measured or calculated, and sets it to the corrected polarization azimuth information on each captured image.

Here, in a case where there is no corrected polarization azimuth information corresponding to the angle of view during imaging in the data of the corrected polarization azimuth information, two pieces of corrected polarization azimuth information having close angles of view are selected from the data, and the corrected polarization azimuth information corresponding to the angle of view during imaging is calculated by interpolating the two pieces of corrected polarization azimuth information. For example, in a case where the angle of view of the captured image calculated from the imaging condition information is diagonally 30° and the angles of view in the data are 12°, 23°, 34°, 47°, 63°, and 84°, two pieces of corrected polarization azimuth information about 23° and 34° are selected and the corrected polarized light direction information about 30° is calculated by linear interpolation of these two pieces of corrected polarized light direction information.

The polarization azimuth setting unit 103 may set a use area in the captured image in which the corrected polarization azimuth information is used to acquire the polarization information. At this time, the polarization azimuth setting unit 103 may set the use area based on the information on the incident angle on the polarizing element acquired from the imaging condition information.

FIG. 5A illustrates the use area as a shaded area in the captured image in which the corrected polarization azimuth information is used to acquire the polarization information in a case where the incident angle on the polarizing element is large. The incident angle on the polarizing element increases from the center of the captured image toward the periphery. The polarization azimuth setting unit 103 calculates the incident angle of the ray to the polarizing element from the imaging condition information, and determines the use area of the corrected polarization azimuth information.

FIG. 5B illustrates the use area as a shaded area in the captured image in which the corrected polarization azimuth information is used to acquire the polarization information in a case where the incident angle to the polarizing element is small. In FIG. 5B, the corrected polarization azimuth information is used in the use area near the center of the captured image which is narrower than that of the case of FIG. 5A. At this time, the use area may be set from the captured image (image sensor) and the aspect ratio of the cropped area. For example, if the aspect ratio of the captured image is 2:3 and the aspect ratio of the crop area is 1:1, the aspect ratio of the use area may be set to 1:1.

The polarization azimuth setting unit 103 may acquire the azimuth of the optic axis (slow axis or fast axis) of the variable retardation plate 2, and set the use area based on the information on the azimuth of the optic axis (referred to as axial azimuth information hereinafter). FIG. 6 illustrates a relationship between the azimuth of the optic axis of the variable retardation plate 2 and the use area of the corrected polarization azimuth information. The polarization azimuth setting unit 103 acquires a rotation angle AR of the slow axis of the variable retardation plate 2 from the x-axis around the optical axis of the optical system (the z-axis in FIGS. 4A and 4B) as the axial azimuth information, and sets a use area (shaded area) tilted from the horizontal axis by the angle AR according to the information.

FIG. 7A illustrates a state in which an optical system OS is shifted (translated) from an image sensor IP, and FIG. 7B illustrates a use area of the corrected polarization azimuth information in that state. In FIG. 7A, OP denotes an object plane, LA denotes an optical axis of the optical system OS, and IA denotes a normal line set at the center of the image sensor IP (referred to as sensor center normal line hereinafter). The polarization azimuth setting unit 103 acquires a shift amount LS (displacement amount of the optical axis LA from the sensor center normal IA) of the optical system OS as the imaging condition information. As illustrated in FIG. 7B, in accordance with the shift amount LS and the shift direction, The polarization azimuth setting unit 103 sets the use area (shaded area) in the captured image by moving it by a shift amount LS' in the shift direction.

FIG. 8A illustrates a state in which the optical system OS is tilted to (moved obliquely from) the image sensor IP, and FIG. 8B illustrates a method of setting (calculating) the corrected polarization azimuth information in that state. In FIG. 8A, LPP denotes a principal plane of the optical system OS. Extension lines of the principal plane LPP of the optical system OS, the image sensor IP, and the object plane OP intersect at one intersection line P according to the Scheimpflug principle. At this time, the incident angle of a ray on the polarizing element changes in the tilt direction according to a tilt amount AT of the optical system OS to the image sensor IP.

As illustrated in FIG. 8B, the polarization azimuth setting unit 103 calculates corrected polarization azimuth information corresponding to the tilt amount using corrected polarization azimuth information set for a captured image in a state in which the optical system OS is not tilted and a changing amount in the transmission polarization azimuth in a plane of the polarizing element according to the tilt amount (gradation in the drawing indicate different changing amounts). At this time, the polarization azimuth setting unit 103 may calculate the corrected polarization azimuth information corresponding to the tilt amount by adding or multiplying the corrected polarization azimuth information and the changing amount in the transmission polarization azimuth, or may acquire new corrected polarization azimuth information from a correlation between the corrected polarization azimuth information and the changing amount in the transmission polarization azimuth.

FIG. 9 illustrates a method of setting the corrected polarization azimuth information according to the manufacturing errors of the polarizing element. The manufacturing errors include, for example, differences of the thickness d and the refractive indices no and ne of the liquid crystal layer of the variable retardation plate 2 from their supposed values, and relative angular errors of the slow axes of the elements (1 to 4) of the polarizing element. Due to these manufacturing errors, the transmission polarization azimuth of the polarizing element may be different from a supposed value. Thus, the polarization azimuth setting unit 103 calculates the corrected polarization azimuth information that compensates for the manufacturing errors, using the supposed value of the transmission polarization azimuth in the plane of the polarizing element illustrated in FIG. 9 and the changing amount in the transmission polarization azimuth according to the manufacturing errors in the plane of the polarizing element (where gradation in FIG. 9 indicates a different changing amount).

Due to the equation (13), the transmission polarization azimuth of the polarizing element changes according to the wavelength of the incident light. Hence, in a case where a captured image has signal values of a plurality of wavelengths (or wavelength ranges) such as a color image, the corrected polarization azimuth information may be set for each wavelength corresponding to the Fraunhofer line such as to the d-line (587.6 nm), g-line (435.8 nm), C-line (656.3 nm), F-line (486.1 nm), and e-line (546.1 nm). Corrected polarization azimuth information for a specific wavelength may be set based on a reference wavelength and a coefficient corresponding to a wavelength change. The corrected polarization azimuth information may be set for each color channel corresponding to the image sensor.

The incident angle of a ray on the polarizing element also changes according to on a pixel position of the image sensor. Therefore, the corrected polarization azimuth information may be set for each pixel or for each area including a plurality of pixels.

FIGS. 10A to 10C illustrate corrected polarization azimuth information (deg) set for each pixel for the R channel, the G channel, and the B channel in an application state of certain voltage to the variable retardation plate 2 at a diagonal angle of 23°. An arrow in these figures indicates a direction of the optic axis of the variable retardation plate 2 projected onto the imaging plane of the image sensor (a plane orthogonal to the optical axis of the optical system). As understood from FIGS. 10A to 10C, the corrected polarization azimuth information is set to be distributed line-symmetrically with respect to a symmetry axis in the captured image corresponding to the optic axis of the variable retardation plate 2.

The polarization azimuth setting unit 103 may acquire the azimuth of the optic axis of the variable retardation plate 2 and set the corrected polarization azimuth information according to the azimuth of the optic axis. At this time, the polarization azimuth setting unit 103 sets the corrected polarization azimuth information so as to be symmetrical with respect to the symmetry axis corresponding to the optic axis on the captured image. Thus, in a case where the corrected polarization azimuth information is set line-symmetrically with respect to the symmetry axis on the captured image, once the corrected polarization azimuth information for an image area on the symmetry axis and on one side of the symmetry axis is calculated, corrected polarization azimuth information can be set for the entire captured image. Therefore, a calculation amount can be reduced to about half in comparison with a case where the corrected polarization azimuth information about the entire captured image is calculated. Moreover, a data amount of the corrected polarization azimuth information to be previously converted into data for calculating the corrected polarization azimuth information can be reduced to approximately half.

The polarization information acquiring unit 104 acquires polarization information for each pixel and for each color channel from the corrected polarization azimuth information and the captured image set as described above. The image generating unit 105 generates a combined image as described above using the acquired polarization information.

In addition to the functions described above, the imaging condition acquiring unit 102 may acquire information on the lens 20 (referred to as lens information hereinafter) from the header information in the captured image, and additionally acquire other imaging condition information according to the acquired lens information. The lens information includes information on a lens manufacturer, a lens name, and a lens characteristic for specifying the lens that is used for imaging. In a case where the lens identified by the lens information is a lens with a large imaging magnification (for example, a macro lens), the focus state and F-number may be acquired as the additional imaging condition information, and that information may be considered in setting the corrected polarization azimuth information. In a case where the lens identified by the lens information has a shift or tilt function, the shift or tilt amount of the lens relative the image sensor may be acquired as the additional imaging condition information, and that information may be considered in setting the corrected polarization azimuth information.

Optical information, such as an optical arrangement, an exit pupil position, and an imaging magnification of a lens in association with the lens information, may be stored as the imaging condition information in a storage device, such as a hard disk drive or cloud computing in the image processing apparatus 100, and that information may be retrieved from the storage device according to the lens information.

Second Embodiment

Figure 12:
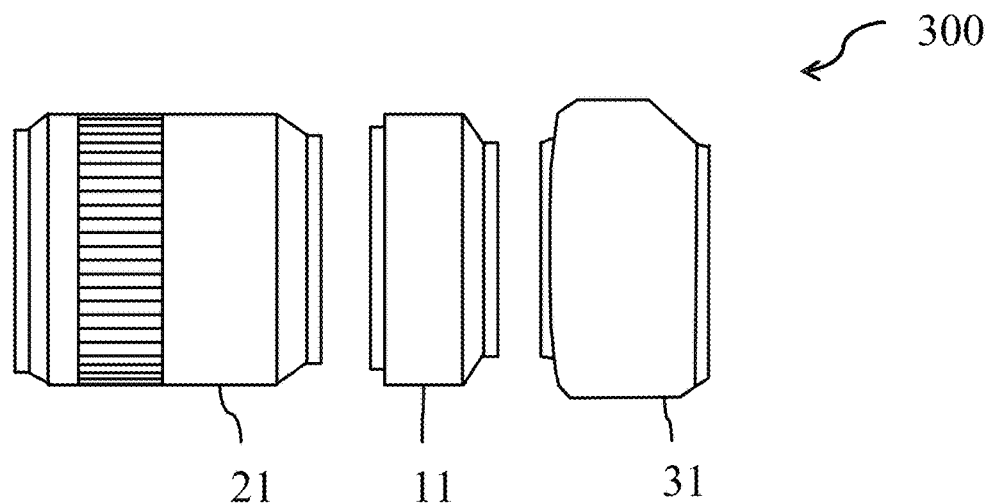
FIG. 12 illustrates a configuration of an image pickup apparatus according to the second embodiment.

An image processing apparatus according to a second embodiment calculates polarization information from a captured image generated by imaging using the image pickup apparatus 300 illustrated in FIG. 12, and generates a combined image. The image pickup apparatus 300 includes a polarizing element adapter 11, a lens 21, and a camera body 31. The polarizing element adapter 11 has a polarizing element whose transmission polarization azimuth is variable. The lens 21 and camera body 31 correspond to the lens 20 and camera body 30 of the first embodiment. The configuration of the image processing apparatus built in the camera body 30 is the same as that of the image processing apparatus 100 in the first embodiment.

The polarizing element adapter 11 is disposed between the lens 21 and the camera body 31 and is attachable to and detachable from each of them. Since the polarizing element adapter 11 is located between the lens (optical system) 21 and the camera body (image sensor) 31, the incident angle of a ray on the polarizing element adapter 11 can be approximately determined by the exit pupil position of the optical system and the sensor size. Thus, even in this embodiment, the imaging condition acquiring unit 102 in the image processing apparatus acquires the information on the exit pupil position and the sensor size as the imaging condition information from header information in a captured image. Other processing executed by the image processing apparatus is the same as that of the first embodiment.

In the image pickup apparatus 300, the polarizing element adapter 11 may be integrated with the lens 21 so that the polarizing element is interchangeable.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Reference Example 1

Figure 13:
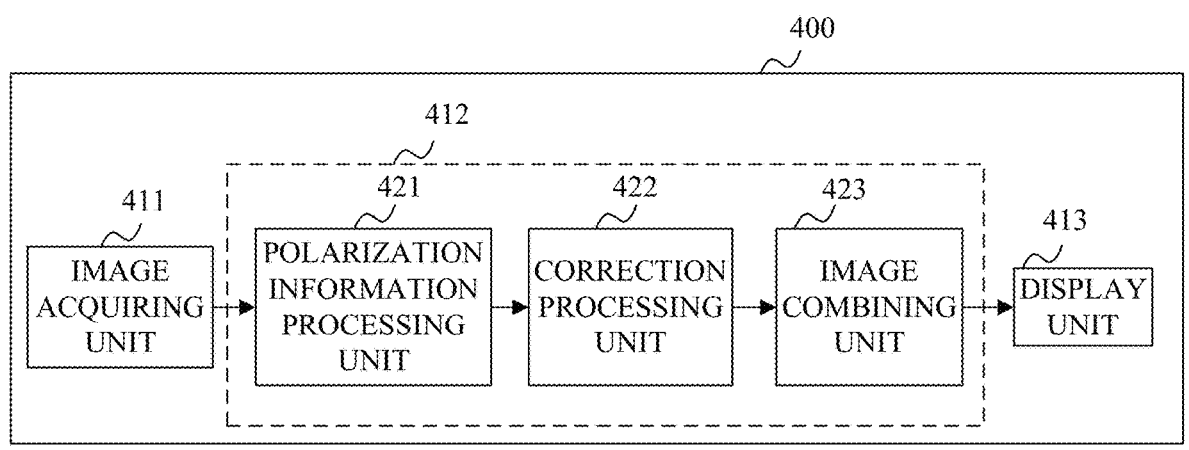
FIG. 13 illustrates a configuration of an image processing apparatus according to reference example 1.

Referring now to FIG. 13, a description will be given of a configuration of an image processing apparatus 400 according to reference example 1. The image processing apparatus 400 includes an image acquiring unit 411, a calculating unit 412, and a display unit 413.

The image acquiring unit 411 acquires a polarization image from a storage medium connected to the image processing apparatus 400 or from a folder on a network such as the cloud computing via the Internet. The polarization image is a captured image acquired by imaging in a plurality of polarization states. For example, the polarization image includes a plurality of captured images acquired by imaging with different transmission polarization azimuths of a polarizing plate, an image acquired by imaging using a polarization sensor, and the like. The acquired image may be a so-called raw image, and an image in which luminance correction such as gamma correction has been made for input luminance may be returned to an image having a pre-correction luminance value by inverse conversion.

The calculating unit 412 calculates a gloss component (specular reflection component) and a base component (diffuse reflection) of an object from the polarization image acquired by the image acquiring unit 411, and creates a corrected gloss component in which gradation that changes the luminance in a specific direction is added to the acquired gloss component. In addition, the calculating unit 412 generates a combined image different from the acquired polarization image by combining the acquired corrected gloss component and the base component. This reference example separates the gloss component and the base component from each other, and adds the gradation only to the gloss component. This configuration can modulate a ratio between the gloss component and the base component after imaging, and adjust the appearance of the object after imaging.

The display unit 413 displays the combined image generated by the calculating unit 412. The display unit 413 is not limited as long as it is configured to display images, such as a liquid crystal display or an organic EL display.

Figure 14:
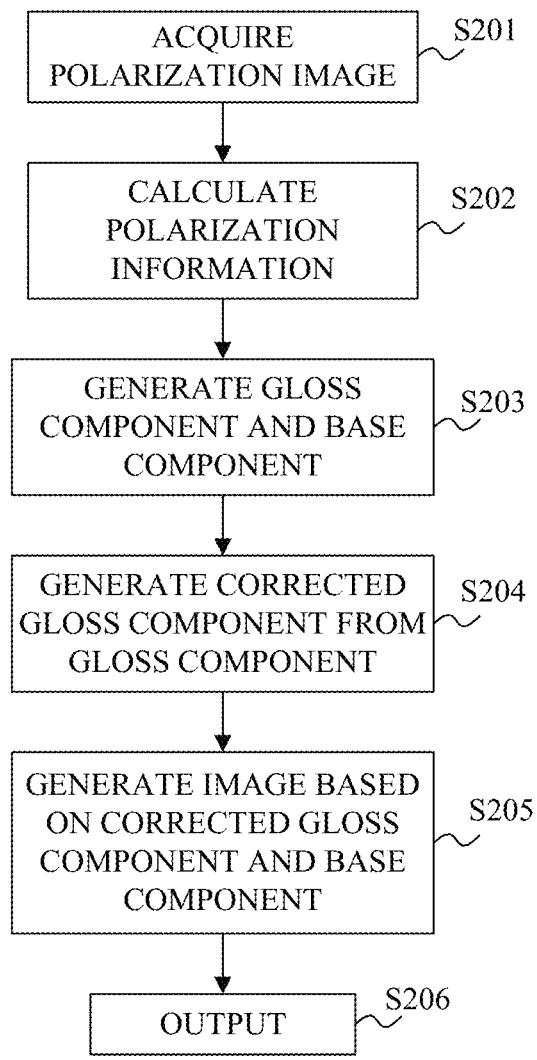
FIG. 14 is a flowchart illustrating processing according to reference example 1.

A description will be given of combined image generating processing executed by the calculating unit 412. FIG. 14 is a flowchart of basic processing. As illustrated in FIG. 13, the calculating unit 412 includes a polarization information acquiring unit (polarization information processing unit) 421, a correction processing unit 422, and an image generating unit (image combining unit) 423. The polarization information acquiring unit 421 acquires a luminance component $I_s$ that changes according to a change in a polarization state and a luminance component $I_b$ that is independent of the change in the polarization state from the polarization image (S201) acquired by imaging in a plurality of polarization states, for each pixel and each color channel (S202).

More specifically, the luminance components $I_s$ and $I_b$ are calculated by the following method.

A luminance change $I(\alpha)$ relative to a transmission polarization azimuth $\alpha$ is expressed by the following equation (21).

$$I(\alpha)=I_s \cdot \cos^2(\alpha-\theta)+I_b \qquad (21)$$

The luminance change $I(\alpha)$ can be expressed with a maximum luminance value $I_{MAX}$ and a minimum luminance value $I_{min}$ of $I(\alpha)$.

$$I(\alpha)=(I_{MAX}-I_{min})\cos^2(\alpha-\theta)+I_{min} \qquad (22)$$

where $\theta$ in equations (21) and (22) is a polarization azimuth where $I(\alpha)$ becomes the maximum value $I_{MAX}$.

In a case where a polarization images is imaged in three or more different polarization states, the luminance components $I_s$ and $I_b$, $I_{MAX}$, $I_{min}$, and $\theta$ in each pixel can be calculated by using the equations (21) and (22). In a case where the polarization images is imaged in three polarization states, one solution is uniquely determined, but in a case where the polarization images is imaged in four or more polarization states, one solution cannot be uniquely determined.

On the other hand, in a case where the polarization image is imaged in two different polarization states, $I_s$ may be set to a luminance difference between the two polarization states, and $I_b$ may be set to a luminance component that is invariant between the two polarization states.

The polarization information acquiring unit 421 according to this reference example may properly use the above two methods according to the type of the polarization image, the processing ability of the processing apparatus, etc., or may select processing in accordance with an external input.

Next, the polarization information acquiring unit 421 generates a gloss component A and a base component B using the two luminance components (luminance values) $I_s$ and $I_b$ (S203). This reference example sets the luminance component $I_s$ to the gloss component A, and the luminance component $I_b$ to the base component B.

The gloss component and the base component in this reference example are not limited to the above example, and may be arbitrarily set based on the polarization information acquired as described above. For example, the gloss component may be selected as a constant multiple $C_s I_s$ ($C_s$ is an arbitrary constant) of the luminance component $I_s$ or a polarized light component $C_s' I_s \cos^2(\alpha_c-\theta)$ ($C_s'$ is an arbitrary constant) at a specific polarization azimuth $\alpha_c$. Alternatively, the gloss component may be selected as a linear sum $I_s \cos^2(\alpha_{C1}-\theta)+I_s \cos^2(\alpha_{C2}-\theta)+ \ldots$ of polarized light components at a plurality of polarization azimuths $\alpha_{C1}$, $\alpha_{C2}$, .... Alternatively, the gloss component may be selected as a combination of them, or may be selected one of them according to applications.

Next, the correction processing unit 422 generates a corrected gloss component in which gradation processing has been performed for the gloss component (S204) by multiplying the gloss component for each pixel and for each color channel by a different correction coefficient according to the pixel position. The correction coefficient that is used at this time is set so as to increase or decrease in an arbitrary direction of the image (referred to as a u-axis direction hereinafter). A direction orthogonal to the u-axis direction (referred to as a v-axis direction hereinafter) is set to have a constant value. Thus, multiplying the gloss component by the different correction coefficient according to the pixel position can generate the corrected gloss component in which the gloss component increases or decreases in the u-axis direction (or that has received the gradation processing).

FIGS. 15A to 15C illustrate an axial azimuth and correction coefficient according to this reference example. FIG. 15A illustrates the axial azimuth relative to the image, FIG. 15B illustrates a correction coefficient k in the u-axis direction, and FIG. 15C illustrates a correction coefficient k in the v-axis direction. A horizontal direction of the image is defined as the x-axis direction, an arbitrary direction is defined as the u-axis direction that indicates a gradation direction as described above, and a direction orthogonal to the u-axis is defined as the v-axis direction.

As illustrated in FIG. 15C, the correction coefficient k has a constant value in the v-axis direction. As illustrated in FIG. 15B, the correction coefficient k decreases in the u-axis direction. Decreasing in the u-axis direction means that arbitrary $u_{c1}$ and $u_{c2}$ that satisfy $u_{c1} < u_{c2}$ satisfies the following inequality.

$$k_{uc2} \leq k_{uc1} \qquad (23)$$

Contrary to this reference example, increasing in the u-axis direction means that arbitrary $u_{c1}$ and $u_{c2}$ that satisfy $u_{c1} < u_{c2}$ satisfies the following inequality.

$$k_{uc2} \geq k_{uc1} \qquad (24)$$

In this reference example, the correction coefficient k can be arbitrarily set within a range that satisfies the inequality (23) or (24), and may monotonically increase or decrease in the u-axis direction. However, in order to obtain an image with a higher texture, an area (boundary area) may be provided in which the changing amount is larger than that of another area.

In FIG. 15B, a coefficient change is larger between $u_{b1}$ and $u_{b2}$ than that in another area (such as between $u_0$ and $u_{b1}$ and between $u_{b2}$ and $u_1$). Providing this boundary area achieves sharp gradation processing for the gloss component, and can provide a combined image with a high texture. An area in which the correction coefficient k is constant may be provided to part of the image.

FIGS. 16A and 16B illustrate another example of the correction coefficient k in the u-axis direction. FIG. 16A illustrates an example in which the boundary area is set to one point (having no width) on the u-axis, and FIG. 16B illustrates an example in which the correction coefficient k changes in a curved shape on the u-axis.

The boundary area may be settable arbitrarily and by an external input in order to generate an image that reflects the intention of the user. The external input of the boundary area can be implemented by specifying, for example, a position B $(u_b, v_b)$ and a width $\Delta u_b = u_{b2} - u_{b1}$ of the boundary area.

Next, a corrected gloss component A' is generated for each pixel and for each color channel based on the following equation (25) and the generated correction coefficient k.

$$A' = kA \qquad (25)$$

An image I' is combined from the generated corrected gloss component A' and the base component B (S205). The combination can be most simply generated by the following equation (26).

$$I' = A' + B \qquad (26)$$

The following equation (27) using arbitrary constants $C_1$ and $C_2$ may be used instead of the equation (26).

$$I' = C_1 A' + C_2 B \qquad (27)$$

Finally, the generated image I' is output to the display unit 413 (S206).

As in the basic processing illustrated in FIG. 14, a series of processing from acquisition to output of the polarization image has been described above as one-time processing, but part of the processing may be repeated. For example, after S201 to S206, S204 to S206 may be repeated while the position and width of the boundary area, the value and changing amount of the correction coefficient, etc. are changed in order to create images with higher textures. Information, such as an image being created in each step and a coefficient, may be properly output as an image.

The above gradation application and other image processing (noise reduction, white balance adjustment, contrast enhancement, etc.) can be combined if necessary. In that case, the order of image processing other than gradation application is not particularly limited. However, if it is performed before the corrected gloss component and the base component are combined, optimum processing can be independently applied to each of the corrected gloss component and the base component.

Reference Example 2

Figure 17:
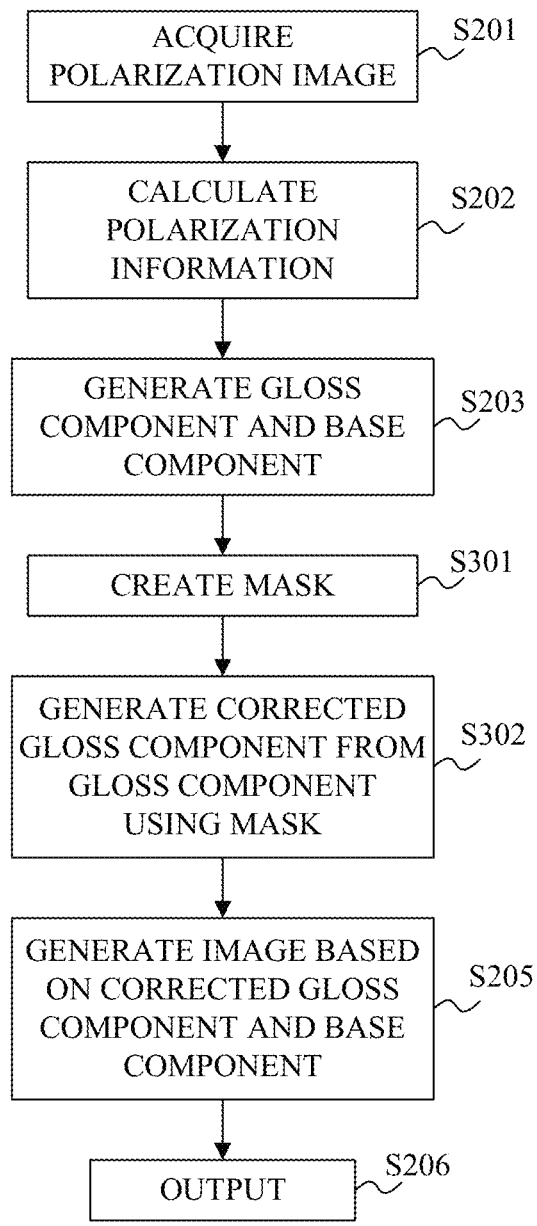
FIG. 17 is a flowchart illustrating processing according to reference example 2.

Referring now to FIG. 17, a description will be given of processing executed by an image processing apparatus according to reference example 2. Reference example 1 generates the corrected gloss component over the entire image, but reference example 2 selects a partial area of the image and generates a corrected gloss component only within that selected area (S301). In addition, reference example 2 creates a mask to specify the area (S302). Since the processing and apparatus configuration other than use of the mask are the same as those of reference example 1, a description relating to the mask (S301, S302) will be given below.

The method of creating the mask in S301 is not particularly limited, and can use, for example, a method of specifying the arbitrary area in the image through an external input, a method of extracting a specific area using polarization information, or the like. Alternatively, a method of specifying an area by a combination of the external input and the polarization information may be used.

The method of using the polarization information may be, for example, a method of using the polarization information A, B, and θ calculated in S202. This method can create the mask by specifying an area in which the polarization azimuth θ falls within a specific range, or by specifying an area in which A or B is equal to or larger than a threshold. This reference example calculates a degree of polarization DOP based on the following equation (28) and the polarization information, extracts an area where the degree of polarization DOP is higher than a threshold $V_{th}$, and uses the area as a mask.

$$DOP = (I_{max} - I_{min})/(I_{max} + I_{min}) = A/(2A+B) \qquad (28)$$

The threshold $V_{th}$ may be properly selected according to images. In order to acquire the texture improvement effect by gradation, the threshold $V_{th}$ may be set to a certain value or higher. More specifically, the threshold $V_{th}$ may be set to a value larger than a value made by averaging the degrees of polarization of pixels over the entire image.

If the image is a color image, a common mask may be used for all colors instead of applying a different mask for each color. For example, an area extracting result for a specific color may be applied to all colors or after the area extraction is performed for each color, an area that covers all the extracted areas is calculated and applied to all the colors.

A corrected gloss component is generated from the gloss component by using the mask generated by the method described above (S302). More specifically, the corrected gloss component is generated within the mask area by multiplying the gloss component by the correction coefficient k to apply gradation to it in the mask area. Here, the method of creating the correction coefficient k is the same as that of reference example 1. The gradation is not applied to the gloss component outside the mask area. The corrected gloss component may use both the gradation-applied gloss component within the mask area and the non-gradation-applied gloss component outside the mask area, or a component only in the mask area. An image is generated based on the last corrected gloss component and the base component (S205). A specific procedure is similar to that of S205 in reference example 1.

This reference example applies gradation only to a gloss component in a specific area using a mask, enables sharp gradation processing, and provides a combined image with a high texture.

Reference Example 3

Reference example 3 is directed to an image processing system that includes the image processing apparatus according to the disclosure and performs image acquisition to image processing. The image processing system according to this reference example includes an image pickup apparatus and an illumination apparatus in addition to the image processing apparatus.

The image pickup apparatus is an apparatus for capturing images with different polarization states, and includes a lens, a camera (image sensor) detachably attachable to the lens, and a polarizing unit. Here, the polarizing unit is disposed between the object and the image pickup apparatus, and includes a polarizing plate, an element using liquid crystal disclosed in JP 2016-145924, or the like. A so-called polarization sensor may be used in which polarizers are disposed in different axial azimuths in front of pixels on the image sensor.

Ideally, the illumination apparatus may be able to evenly illuminate the object from all directions, and to irradiate the object with light from two directions or more. Illuminating the entire object using such an illumination apparatus can provide the gloss component of the object regardless of a surface normal. Such an illumination method includes, for example, a method of irradiating lights from a plurality of directions using a plurality of illumination apparatuses, and a method of using a so-called illumination apparatus called a light box. Another method is a method of using a ring light, a strobe, a diffuser for diffusing light, etc. singularly or in combination.

The image processing apparatus may use, for example, a display unit, a PC, a tablet terminal, a smartphone, etc. The image processing apparatus can perform image processing inside the image processing apparatus using software or applications installed in the image processing apparatus. The image processing apparatus may be connected to the Internet so that some or all of image processing is performed on the cloud computing, or an image is stored on the cloud computing. In addition to control over the image processing apparatus, the control apparatus included in the image processing apparatus may control the image pickup apparatus and the illumination apparatus. At that time, the control apparatus, the image pickup apparatus, and the illumination apparatus may be connected by wire or wirelessly.

Each of the above embodiments and examples can provide polarization information in which the influence of the incident angle characteristic of the polarizing element is reduced.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-195669, filed on Dec. 1, 2021, which is hereby incorporated by reference herein in its entirety.

What is claimed is:

1. An image processing apparatus comprising at least one processor, and a memory coupled to the at least one processor, the memory storing instructions that, when executed by the processor, perform operations as:
   a first acquiring unit configured to acquire a first image generated by imaging an object via a polarizing element configured to polarize and transmit lights such that the lights have a plurality of polarization azimuths that are different from each other;
   a second acquiring unit configured to acquire information on an imaging condition in the imaging for acquiring the first image;
   a setting unit configured to acquire information on the plurality of polarization azimuths of the lights and to set corrected polarization azimuth information based on a) the information on the plurality of polarization azimuths of the lights, b) an incident angle characteristic of the polarizing element, and c) the information on the imaging condition; and
   a third acquiring unit configured to acquire polarization information using the first image and the corrected polarization azimuth information.

2. The image processing apparatus according to claim 1, wherein the corrected polarization azimuth information is information on a plurality of polarization azimuths, each of which is set for a respective pixel or area of the first image.

3. The image processing apparatus according to claim 1, wherein the corrected polarization azimuth information is information on polarization azimuths of a plurality of lights having different wavelengths.

4. The image processing apparatus according to claim 1, wherein the information on the imaging condition includes information on an incident angle of a ray on the polarizing element.

5. The image processing apparatus according to claim 1, wherein in a case where an optical system and an image sensor are used for the imaging, the information on the imaging condition includes information on a focal length of the optical system and a size of the image sensor.

6. The image processing apparatus according to claim 1, wherein in a case where an optical system and an image sensor are used for the imaging, the information on the imaging condition includes information on an exit pupil position of the optical system and a size of the image sensor.

7. The image processing apparatus according to claim 1, wherein in a case where an optical system is used for the imaging, the information on the imaging condition includes information on a focus state of the optical system or a position of the object.

8. The image processing apparatus according to claim 1, wherein in a case where the polarizing element includes a variable retardation plate and a polarizing plate, the setting unit sets the corrected polarization azimuth information using information on an azimuth of one of a fast axis and a slow axis of the variable retardation plate.

9. The image processing apparatus according to claim 8, wherein the setting unit sets the corrected polarization azimuth information so as to be symmetrical with respect to a symmetry axis that extends in an azimuth of the one of the fast axis and the slow axis of the variable retardation plate.

10. The image processing apparatus according to claim 1, wherein the memory stores the corrected polarization azimuth information, and wherein the setting unit sets the corrected polarization azimuth information based on the information on the imaging condition among the corrected polarization azimuth information that has been stored in the memory.

11. The image processing apparatus according to claim 1, wherein the setting unit sets a use area for acquiring the polarization information using the corrected polarization azimuth information.

12. The image processing apparatus according to claim 11, wherein in a case where an optical system and an image sensor are used for the imaging and the optical system is displaceable in at least one of a shift direction and a tilt direction relative to the image sensor, the setting unit sets the use area according to a displacement amount of the optical system relative to the image sensor acquired as the information on the imaging condition.

13. The image processing apparatus according to claim 1, wherein the third acquiring unit acquires the polarization information from a change in signal values in a plurality of polarization azimuths acquired from the first image.

14. The image processing apparatus according to claim 1, wherein the instructions, when executed by the processor, further perform operations as an image generating unit configured to generate a second image using the polarization information.

15. The image processing apparatus according to claim 1, wherein, to set the corrected polarization azimuth information, the setting unit is configured to correct the information on the plurality of polarization azimuths of the lights based on the incident angle characteristic of the polarizing element and on the information on the imaging condition.

16. An image pickup apparatus comprising:
an image processing apparatus that includes at least one processor, and a memory coupled to the at least one processor, the memory storing instructions that, when executed by the processor, perform operations as:
a first acquiring unit configured to acquire a first image generated by imaging an object via a polarizing element configured to polarize and transmit lights such that the lights a plurality of polarization azimuths that are different from each other;
a second acquiring unit configured to acquire information on an imaging condition in the imaging for acquiring the first image;
a setting unit configured to acquire information on the plurality of polarization azimuths of the lights and to set corrected polarization azimuth information based on a) the information on the plurality of polarization azimuths of the lights, b) an incident angle characteristic of the polarizing element, and c) the information on the imaging condition; and
a third acquiring unit configured to acquire polarization information using the first image and the corrected polarization azimuth information; and
an image sensor configured to perform the imaging.

17. An image processing method comprising:
acquiring a first image generated by imaging an object via a polarizing element configured to polarize and transmit lights such that the lights have a plurality of polarization azimuths that are different from each other;
acquiring information on an imaging condition in the imaging;
acquiring information on the plurality of polarization azimuths of the lights;
setting corrected polarization azimuth information based on a) the information on the plurality of polarization azimuths of the lights, b) an incident angle characteristic of the polarizing element, and c) the information on the imaging condition; and
acquiring polarization information using the first image and the corrected polarization azimuth information.

18. A computer-readable non-transitory storage medium storing a program that causes a computer to execute the image processing method according to claim 17.

* * * * *